(12) United States Patent
Elnesr et al.

(10) Patent No.: US 8,359,918 B1
(45) Date of Patent: Jan. 29, 2013

(54) RAIN GAUGE WITH PARTICULATE SEPARATOR

(75) Inventors: Mohammad N. B. Elnesr, Riyadh (SA); Mohamad Elfarrah, Riyadh (SA); Abderrahman Ali Alazba, Riyadh (SA); Majed Abu-Zreig, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/298,120

(22) Filed: Nov. 16, 2011

(51) Int. Cl.
*G01W 1/14* (2006.01)
(52) U.S. Cl. .................... 73/170.21; 73/170.17
(58) Field of Classification Search .............. 73/170.17, 73/170.21, 170.23
See application file for complete search history.

(56) References Cited

U.S. PATENT DOCUMENTS

| | | | |
|---|---|---|---|
| 3,216,246 A | 11/1965 | Blondeau | |
| 3,243,999 A | 4/1966 | Barker | |
| 4,644,786 A | 2/1987 | Jacobsen et al. | |
| 5,038,606 A | 8/1991 | Geschwender et al. | |
| 5,125,268 A | 6/1992 | Caron | |
| 5,571,963 A | 11/1996 | Balchin et al. | |
| 5,918,278 A | 6/1999 | Chang et al. | |
| 6,640,649 B1 | 11/2003 | Paz et al. | |
| 2006/0191333 A1 | 8/2006 | Noe | |

FOREIGN PATENT DOCUMENTS

| JP | 59-174777 | 10/1984 |
|---|---|---|
| JP | 2000-249774 | 9/2000 |

*Primary Examiner* — Lisa Caputo
*Assistant Examiner* — Punam Roy
(74) *Attorney, Agent, or Firm* — Richard C. Litman

(57) ABSTRACT

The rain gauge with a particulate separator is a balance-type precipitation gauge having a particulate separator for removing sand, dust and other environmental particulate matter. The particulate separator includes a spherical particulate separator mounted beneath a central nozzle and above first and second receptacles of the gauge. A frustoconical particulate separator is mounted beneath the spherical particulate separator and above the first and second receptacles, a central channel being formed therethrough. In operation, liquid flows through the central nozzle and clings to an outer surface of the spherical particulate separator, flowing through the central channel to alternately fill the first and second receptacles. Particulate matter flowing through the central nozzle is deflected by the outer surface of the spherical particulate separator to strike an inclined upper surface of the frustoconical particulate separator, falling through at least one vent formed through the housing to exit the housing.

7 Claims, 10 Drawing Sheets

RAIN GAUGE WITH PARTICULATE SEPARATOR

BACKGROUND OF THE INVENTION

1. Field of the Invention

The present invention relates to meteorological instruments, and particularly to a rain gauge with a particulate separator for removing sand, dust and other environmental particulate matter.

2. Description of the Related Art

FIGS. 2-9 illustrate a typical prior art balance-type precipitation gauge. Referring to FIGS. 2 and 4, the housing 9 includes a rain-collecting funnel 10, which is covered by a gauze filter 11 that is positioned across a discharge outlet 12 to prevent the entry or passage of insects or other foreign matter into a recording mechanism mounted within the housing 9. The funnel 10 is provided with a nozzle or spout 13 connected to a nozzle director 14 carried on a support frame 15. The support frame 15 is mounted within the housing 9 and serves to support the recording mechanism.

The support frame 15 includes a vertically disposed plate, which is held within the housing 9 by spaced side guides 16, each guide 16 being fixed to the inner wall of the housing 9. Pivotally mounted to the support frame 15 beneath the spout 13 is a pair of buckets 17, 17a, which have a triangular cross-sectional configuration. The buckets 17, 17a are symmetrically formed and have identical configurations, dimensions, and volumes. The buckets 17, 17a share a common bifurcated partition wall 18, between which a pivot 19 is mounted.

Stop screws 20 are mounted on the frame 15 below the buckets 17, 17a and are arranged to limit the pivotal tilting movements of the buckets (e.g., as shown in FIG. 4, with the buckets 17, 17a in this example tilting towards the right in the Figure). In the example of FIG. 4, the bucket 17, upon receiving a predetermined amount of rainwater from collection funnel 10, causes both buckets 17, 17a to tilt (to the right in FIG. 4) about the pivot 19, allowing the contents of the bucket 17 to be discharged, and further allowing the other bucket 17a to be properly positioned to receive an equal amount of rainwater. The back-and-forth tilting of the buckets, from receiving to discharging positions, continues as long as the rainwater is delivered from the funnel 10 through the spout 13.

In order to adjust the tilting movement of the buckets 17, 17a so that equal amounts of rainwater will be delivered by each bucket, the stop screws 20, as shown in FIG. 6, are provided with conical heads 21 adapted to contact the base sides 22 of the buckets 17, 17a. The base sides 22 of the buckets 17, 17a are angled to form a gutter so that all of the rainwater received in the buckets 17, 17a is discharged when each bucket assumes the tilted or inclined position. The buckets 17, 17a each discharge their contents into respective arms 23, 24 of a Y-shaped collection chute 25 having a discharge nozzle 26. The buckets 17, 17a and the collection chute 25 form a metering device so that, despite the amount of rain water being delivered through the spout 13, equal and constant amounts of water are discharged by the buckets 17, 17a through the nozzle 26 of the chute 25.

The nozzle 26 delivers the rain water alternately into a second pair of pivotally mounted measuring containers in the form of buckets 27, 27a, which are of larger capacity than buckets 17, 17a, but being of the same construction; i.e., having triangular cross-sectional configurations and equal capacities with respect to one another, and also sharing a common bifurcated partition wall 28, between which a pivot 29 for the buckets 27, 27a passes.

A stud 30 is fixed at the rear of the measuring buckets 27, 27a. The stud 30 extends through an arcuate slot 32 in the support frame 15. The stud 30 contacts adjustable screw stops 33 (shown in FIG. 5), which are adapted to enable the tilting movements of the buckets 27, 27a to be accurately adjusted to ensure that each bucket 27, 27a, upon receiving a predetermined volume of water, will tilt to a discharge position and position the other bucket to a receiving position below the nozzle 26.

Each bucket 27, 27a discharges its contents into a respective discharge pipe 34 located in the bottom of the housing 9. Each discharge pipe 34 is covered by gauze 35 to prevent the entry of insects and foreign matter into the housing 9. Secured to the stud 30 is a permanent magnet 36, which, as it moves during tilting movements of the buckets 27, 27a, passes a mercury magnetic switch 37, which is supported by a clamp 38 on the support frame 15. The mercury switch 37 is located centrally with respect to the arcuate movement of the magnet 36 so that, upon each oscillation of the magnet 36 responsive to the buckets 27, 27a filling and discharging, the switch 37 is actuated to close a circuit, which energizes an electric impulse recording counter 39 (shown in FIG. 3), which is also mounted on the frame 15. The counter 39 has a numeral indicating end 40 positioned to be visible through an inspection window 41 in the wall of the housing 9. The counter 39 may be any suitable type of counter, such as the typical four FIG. 6-V-Ohm counter known in the field of telephones.

FIG. 9 illustrates a circuit for energizing the counter 39, in which a battery 42, supported in brackets 43 on the frame 15, is connected in series with a main control switch 44, the mercury switch 37, and the counter 39. Connected in parallel with the counter 39 is a plug 45, enabling the circuit to be connected to an indicator or recording device (not shown) at a base station. The plug 45 may be connected with a socket 46 mounted in the sidewall of housing 9 for connection to a landline (not shown), which connects the counter 39 with the remote indicator or recorder, and which will be energized simultaneously with the counter 39.

In operation, when rainwater is collected in the funnel 10, it is then passed through the nozzle 13 into the uppermost of buckets 17, 17a. Due to the configuration of the buckets 17, 17a and the pivotal mounting, the addition of the rainwater causes instability. When a predetermined amount of rainwater is received, the bucket 17, 17a will tilt about the pivot 19 until it reaches one of the stop screws 20. At this point, the rainwater is discharged into the collection chute 25, and the other bucket 17, 7a begins to fill with rainwater, and the process then repeats itself.

The water delivered from the buckets 17, 17a is discharged through the nozzle 26, in the same manner, alternately filling the measuring buckets 27, 27a, which, during each oscillation, causes the counter 39 to energize through the magnetic mercury switch 37. If the buckets 27, 27a have been calibrated to hold a certain volume of water before each bucket 27, 27a moves to the discharge position, a reading of the number of full buckets will give a reading of the amount of water collected by the precipitation gauge, which can be calibrated to give a reading of the actual rainfall at the location where the gauge is located.

The coarse calibration is effected by making the buckets 27, 27a the size that is necessary, and the fine calibration is effected by adjusting the positions of the stop screws 33 on the frame 15 and arranged to contact the stud 30 on the buckets 27, 27a so that each bucket 27, 27a tips from one position to the other when the amount of water in either is set to a desired measurement, such as one point of rain.

An example of such a typical prior art precipitation gauge is shown in U.S. Pat. No. 3,243,999, which is hereby incorporated by reference in its entirety. Due to the use of two sets of buckets (i.e., 17, 17a and 27, 27a), rather than a single set of buckets, that are used solely for the measuring process, the above system requires dual calibration and the possibility of mechanical failure, misalignment and necessary maintenance becomes doubled. Additionally, due to the use of gauze to prevent contamination by insects and other foreign matter, the gauze screen must be constantly changed, given that it will become permanently soiled and clogged with each rainfall.

Thus, a rain gauge with a particulate separator solving the aforementioned problems is desired.

SUMMARY OF THE INVENTION

The rain gauge with a particulate separator is a balance-type precipitation gauge having a particulate separator for removing sand, dust and other environmental particulate matter. The particulate separator includes a primary particulate separator mounted beneath a central nozzle and above first and second receptacles of the balance-type precipitation gauge. The primary particulate separator is substantially spherical, and there is at least one open space formed between the primary particulate separator and an inner wall of a housing of the balance-type precipitation gauge.

A secondary particulate separator is mounted beneath the primary particulate separator and above the first and second receptacles of the balance-type precipitation gauge. The secondary particulate separator is substantially frustoconical and has a central channel formed therethrough. At least one vent is formed through the housing and aligned with an upper outer edge of the secondary particulate separator. In operation, liquid flows through the central nozzle and clings to an outer surface of the primary particulate separator and flows through the central channel formed through the secondary particulate separator to alternately fill the first and second receptacles. Particulate matter flowing through the central nozzle is deflected by the outer surface of the primary particulate separator to strike an inclined upper surface of the frustoconical secondary particulate separator to fall through the at least one vent, thus exiting the housing.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
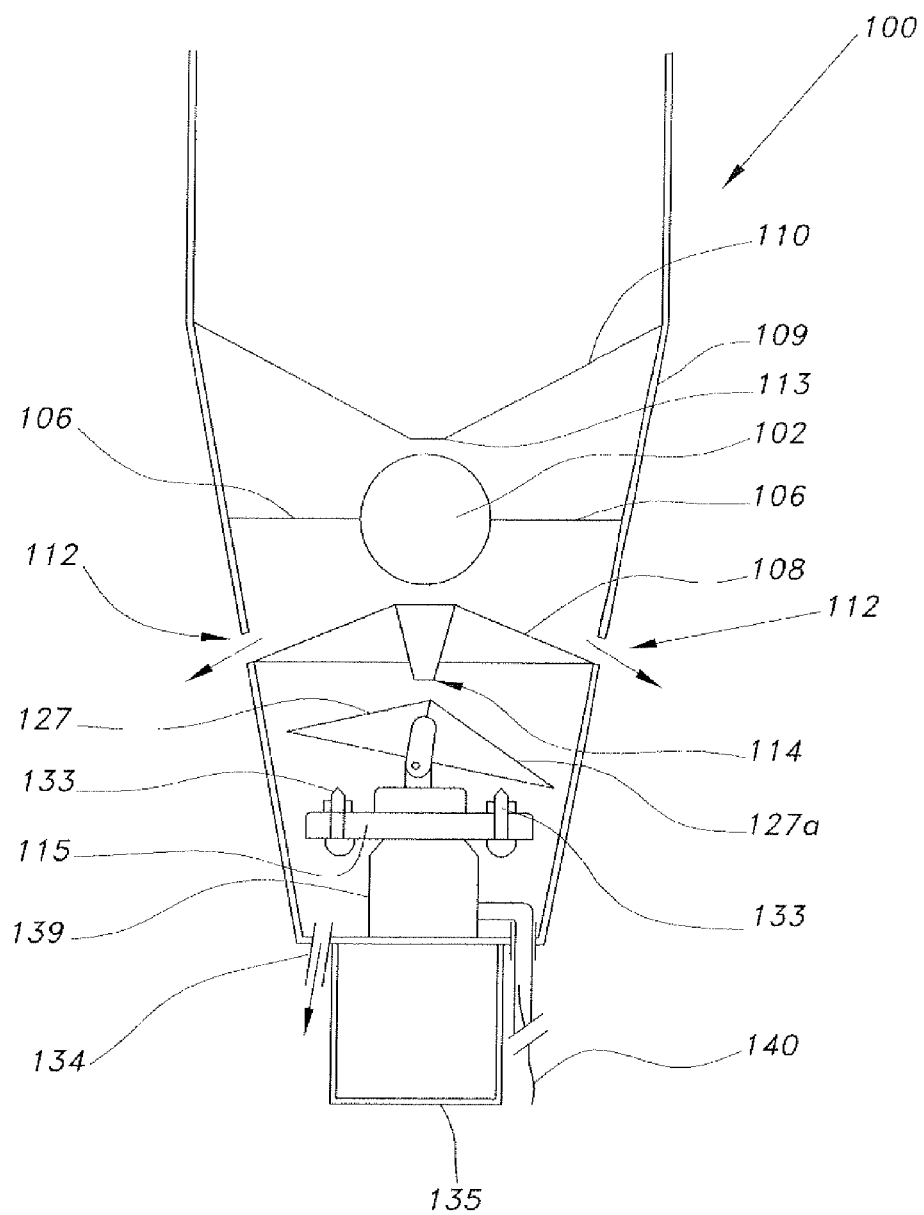
FIG. 1 is a schematic diagram of the interior of a rain gauge with a particulate separator according to the present invention.
Figure 2:
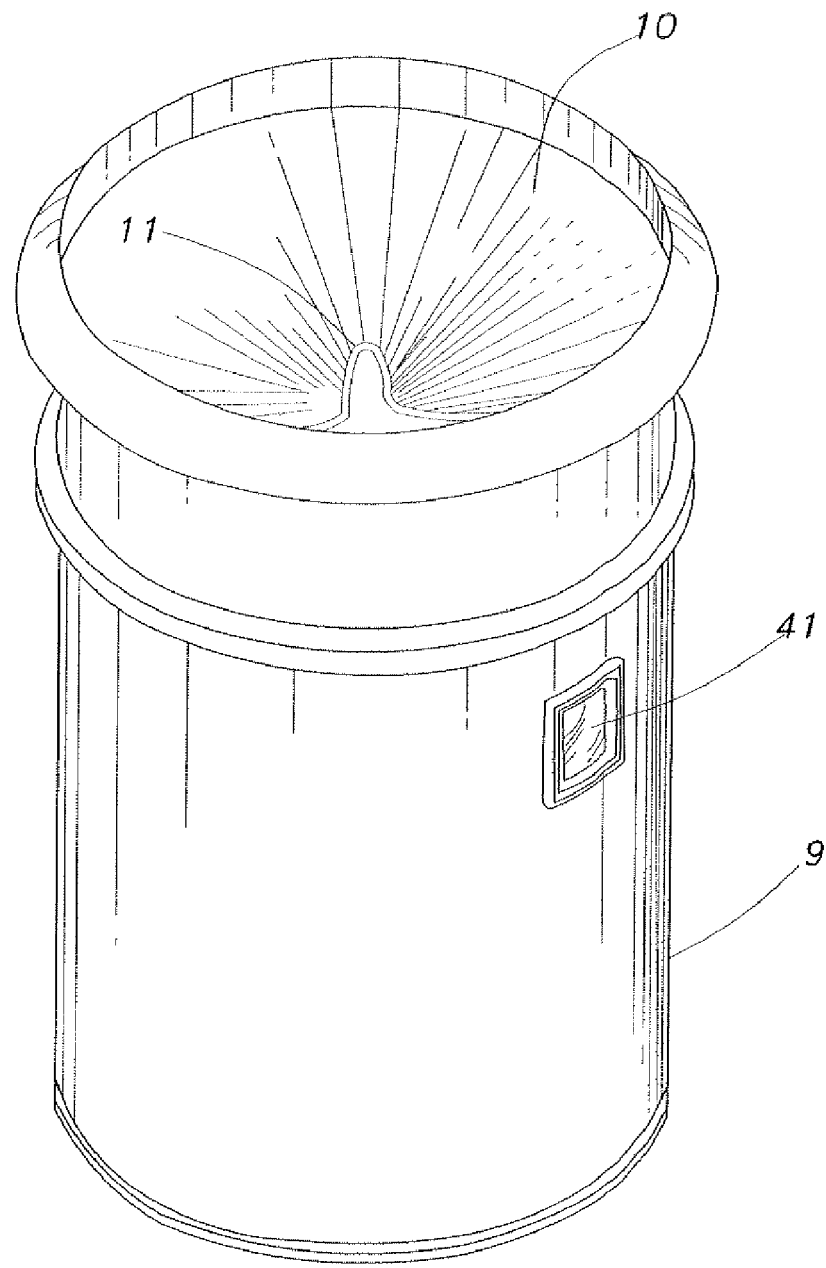
FIG. 2 is a perspective view of a prior art precipitation gauge.
Figure 3:
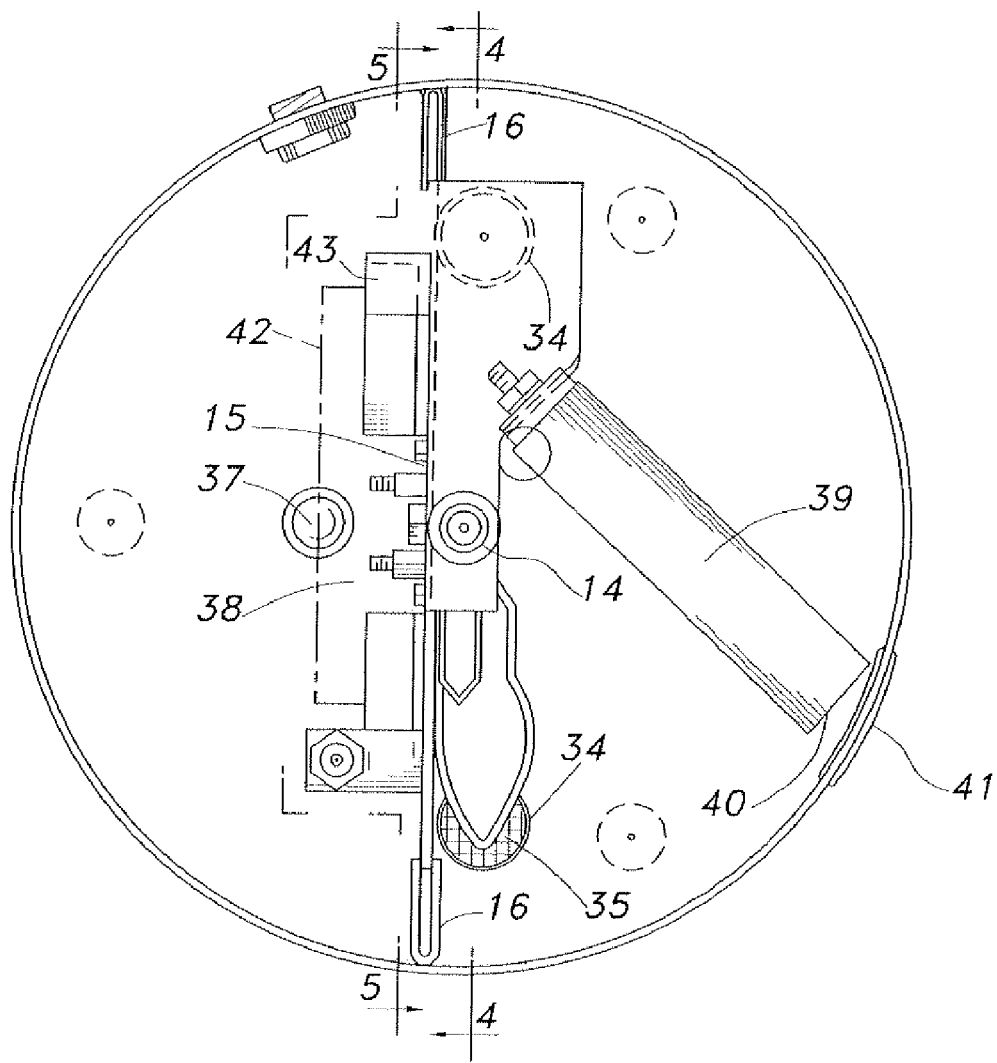
FIG. 3 is a plan view of the prior art precipitation gauge of FIG. 2, shown with a collection funnel thereof removed.
Figure 4:
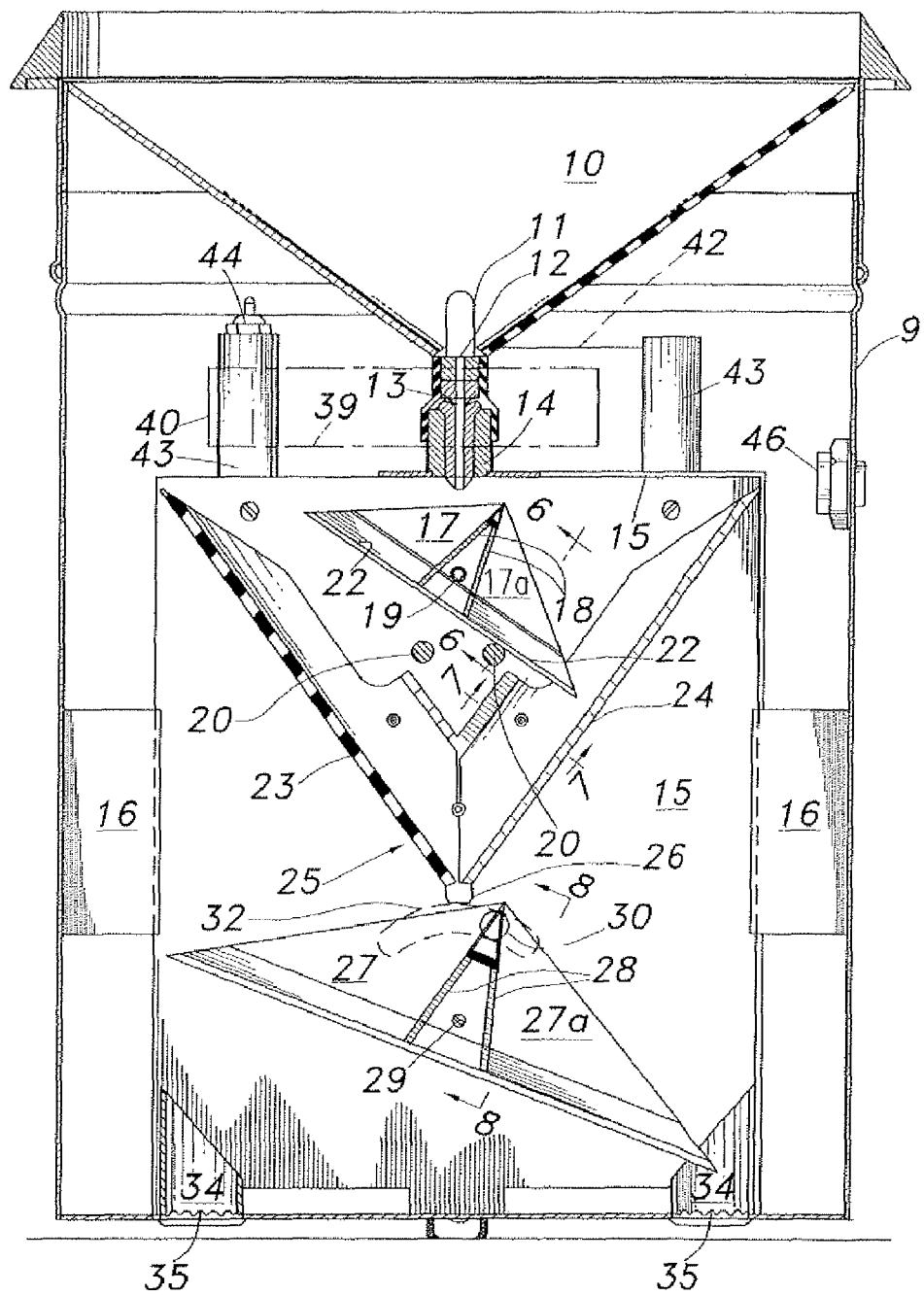
FIG. 4 is a section view along lines 4-4 of FIG. 3, but with the collection funnel shown in position.
Figure 5:
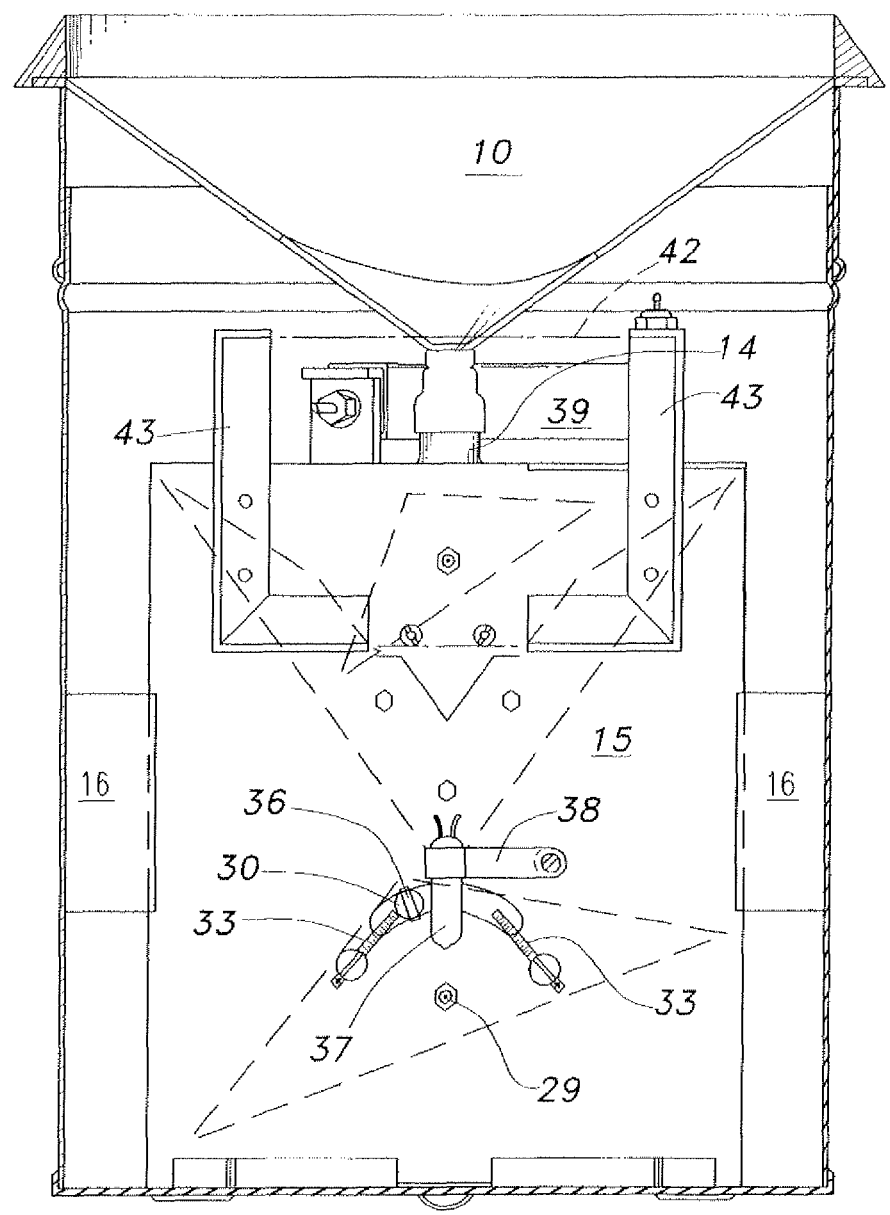
FIG. 5 is a section view along lines 5-5 of FIG. 3.
Figure 6:
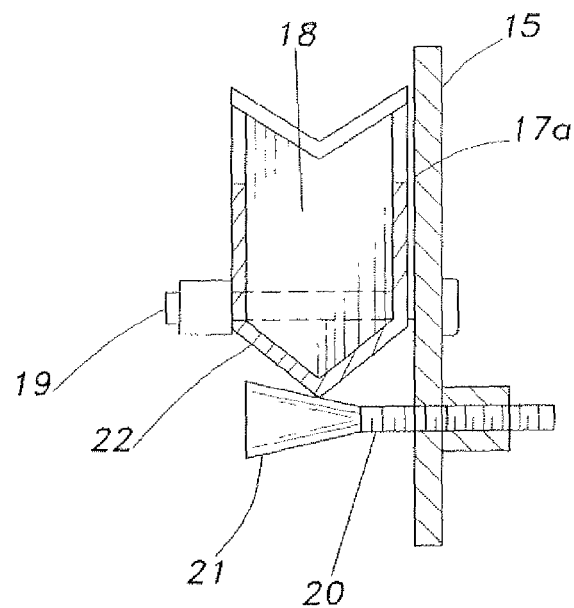
FIG. 6 is a detail section view along lines 6-6 of FIG. 4.
Figure 7:
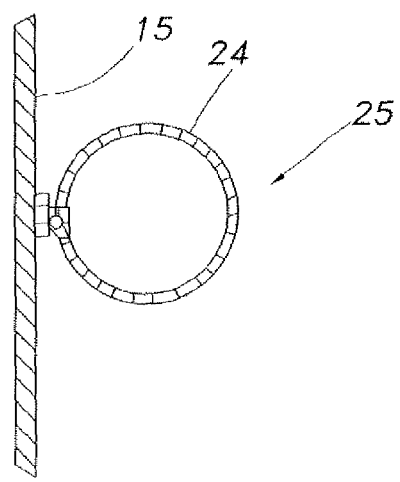
FIG. 7 is a detail section view on lines 7-7 of FIG. 4.
Figure 8:
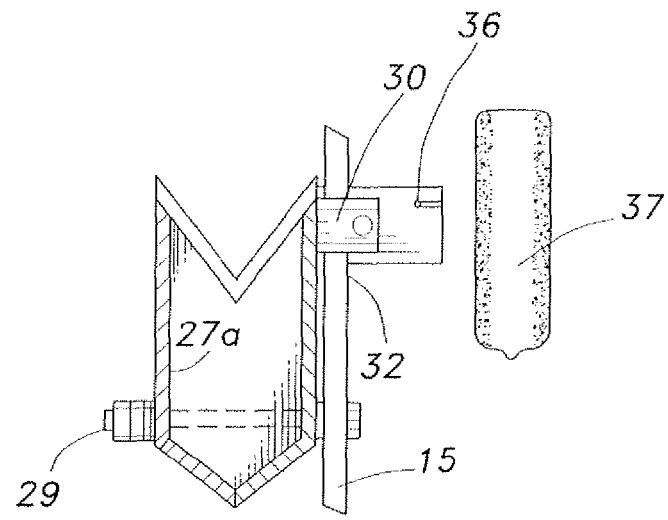
FIG. 8 is a detail section view along lines 8-8 of FIG. 4.
Figure 9:
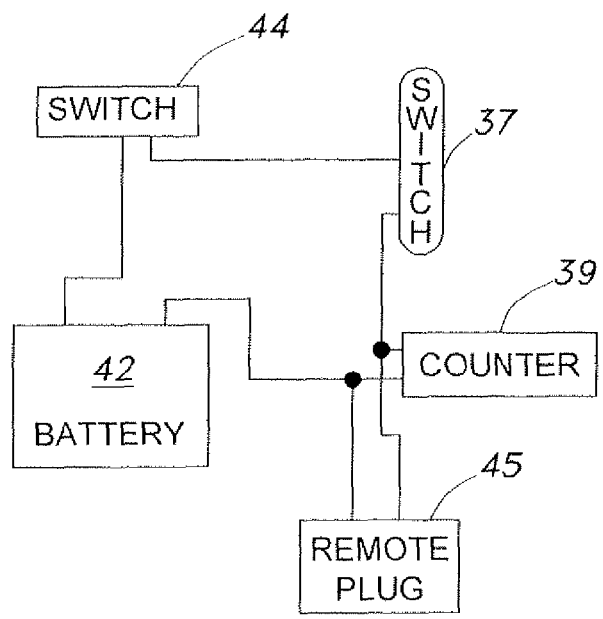
FIG. 9 is a block diagram of a countFng mechanism of the prior art precipitation gauge.

The rain gauge with a particulate separator 100 is similar to the prior art precipitation gauge described above with reference to FIGS. 2-9, but is somewhat simplified with respect thereto. Particularly, the present rain gauge 100 does not include a metering device (i.e., the buckets 17, 17a in combination with collection chute 25 of the prior art precipitation gauge). Rather, in the present rain gauge 100, rainwater flows only to buckets 127, 127a (after flowing through the particulate separator, as will be described in detail below). Similar to the prior art system of FIGS. 2-9, the rain gauge 100, as shown in FIG. 1, includes a funnel 110 mounted in a housing 109, the funnel 110 defining a lower spout or nozzle 113.

Following particulate separation, as will be described in detail below, the rainwater, as in the prior art system described above, flows to buckets 127, 127a. Alternate filling of measuring buckets 127, 127a creates a rhythmic oscillation, which is then measured by counter 139 in a manner similar to that described above with respect to the counter 39 of the prior art system. It should be understood that any suitable type of pulse counter may be utilized. The buckets 127, 127a are calibrated to hold a certain volume of water before each bucket moves to the discharge position, and a reading of the number of full buckets gives a reading of the amount of water collected by the rain gauge 100, which can be calibrated to give a reading of the actual rainfall at the location where the gauge 100 is located.

Coarse calibration is effected by making the buckets 127, 127a the size that is necessary, and fine calibration is effected by adjusting the positions of calibration screws 133 mounted on the frame 115, similar to the adjustment of the stop screws 33 on the frame 15 (arranged to contact the stud 30 on the buckets) described above with regard to the prior art system. A counter 139 is connected by line 140 to a remote system or display for receiving and displaying the measured rainfall. An outlet 134 is formed in the lower end of the housing 109, which is preferably raised by a stand or support 135, as shown, allowing the rainwater to be drained out of housing 109 after either bucket 127 or bucket 127a has discharged its collected volume.

Figure 11:
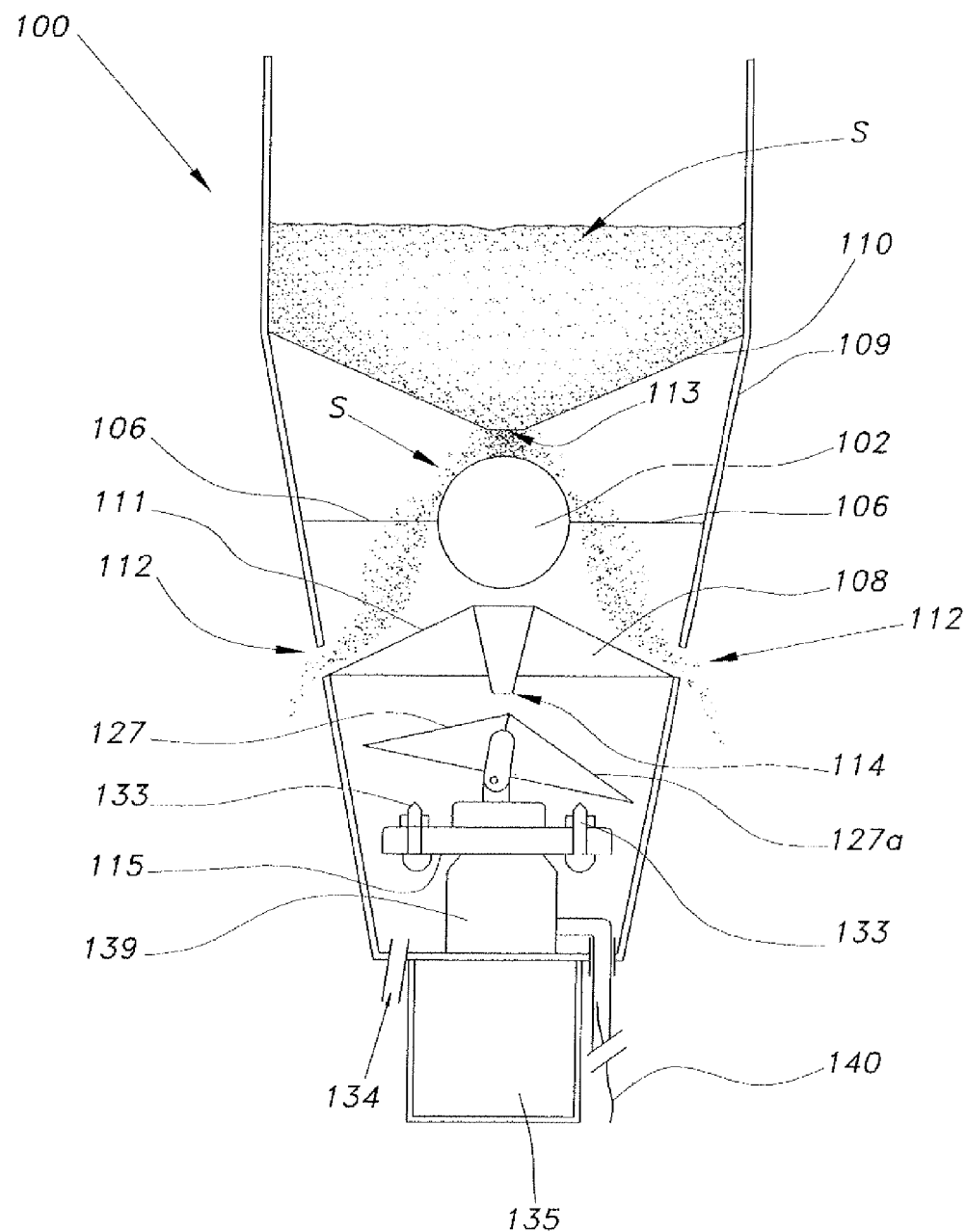
FIG. 11 is a schematic diagram of the interior of the rain gauge of FIG. 1, showing operation in a sandstorm.

As shown in FIGS. 1 and 11, a primary particulate separator 102 is mounted beneath the nozzle 113. The primary particulate separator 102 is spherical and is preferably formed from a corrosion-resistant material. As best shown in FIG. 11, the primary particulate separator is suspended within the housing 109 by a plurality of supports 106, and open spaces 107 are defined between the separator 102 and the housing 109. The supports 106 may be fixed to the interior wall of the housing 109 by a circular bracket 104 or the like.

Mounted directly beneath the primary particulate separator 102 is a secondary particulate separator 108. The secondary particulate separator is frustoconical, thus providing an inclined upper edge 111 extending annularly about a central channel 114 formed therethrough. The nozzle 113, the primary particulate separator 102, and the secondary particulate separator 108 are axially aligned, as shown.

Figure 10:
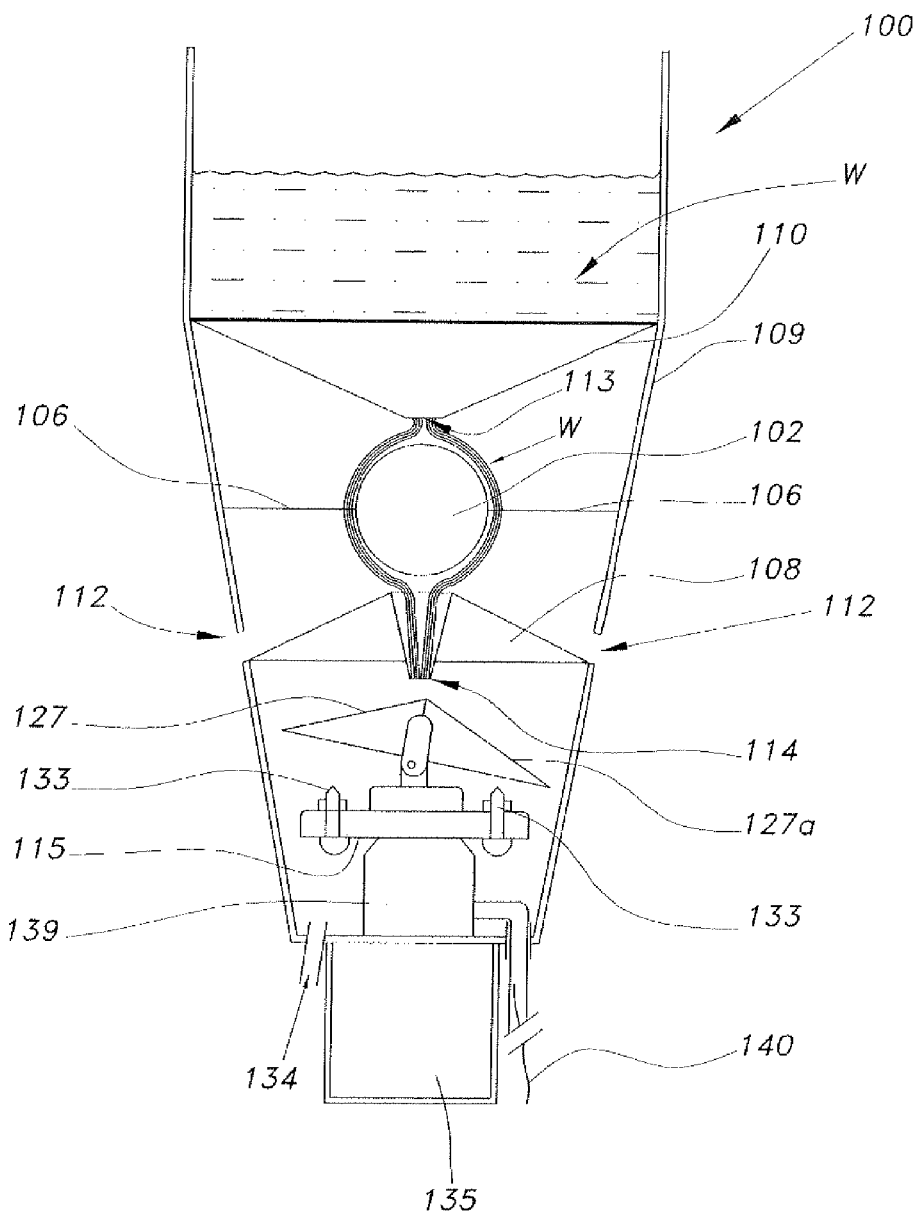
FIG. 10 is a schematic diagram of the interior of the rain gauge of FIG. 1, showing operation in rainfall.

For purposes of simplicity, FIG. 10 illustrates the rain gauge 100 in operation in conditions of pure rainfall (without sand, dust or other particulate matter entering the system). Water W collects in the funnel 110, mounted in the housing 109, and exits through the nozzle 113. Due to surface tension, cohesion and the pressure differential between external environment and the contact point between the water W and the outer surface of the primary particulate separator 102, the water W will cling to and flow around the outer surface of the primary particulate separator 102. This causes the water W to flow directly into the central channel 114 formed through the secondary particulate separator 108, which then feeds directly into the buckets 127, 127a. The alternate filling of the buckets 127, 127a creates a rhythmic oscillation, which is then measured by the counter 139, as described above.

For purposes of illustration, FIG. 11 illustrates the rain gauge 100 in a sandstorm; i.e., with only particulate matter (in the form of sand S) entering the housing 109 and with no liquid present. The sand S fills the funnel 110 and flows through the nozzle 113 to strike the outer surface of the primary particulate separator 102. Since sand S is particulate matter and not liquid, the sand S is deflected from the outer surface, rather than clinging thereto, and passes through the open spaces 107 (of FIG. 12) defined between the supports 106. This deflection prevents the sand S from entering the central channel 114 of the secondary particulate separator 108, which is positioned directly beneath the primary particulate separator 102. The sand S falls on the annular inclined upper surface 111 of the frustoconical secondary particulate separator 108 and falls through the vents 112 to exit the housing 109, without being able to reach the buckets 127, 127a or the lower portion of housing 109, thus preventing contamination of the measuring portion of the rain gauge 100 by the particulate matter.

Figure 12:
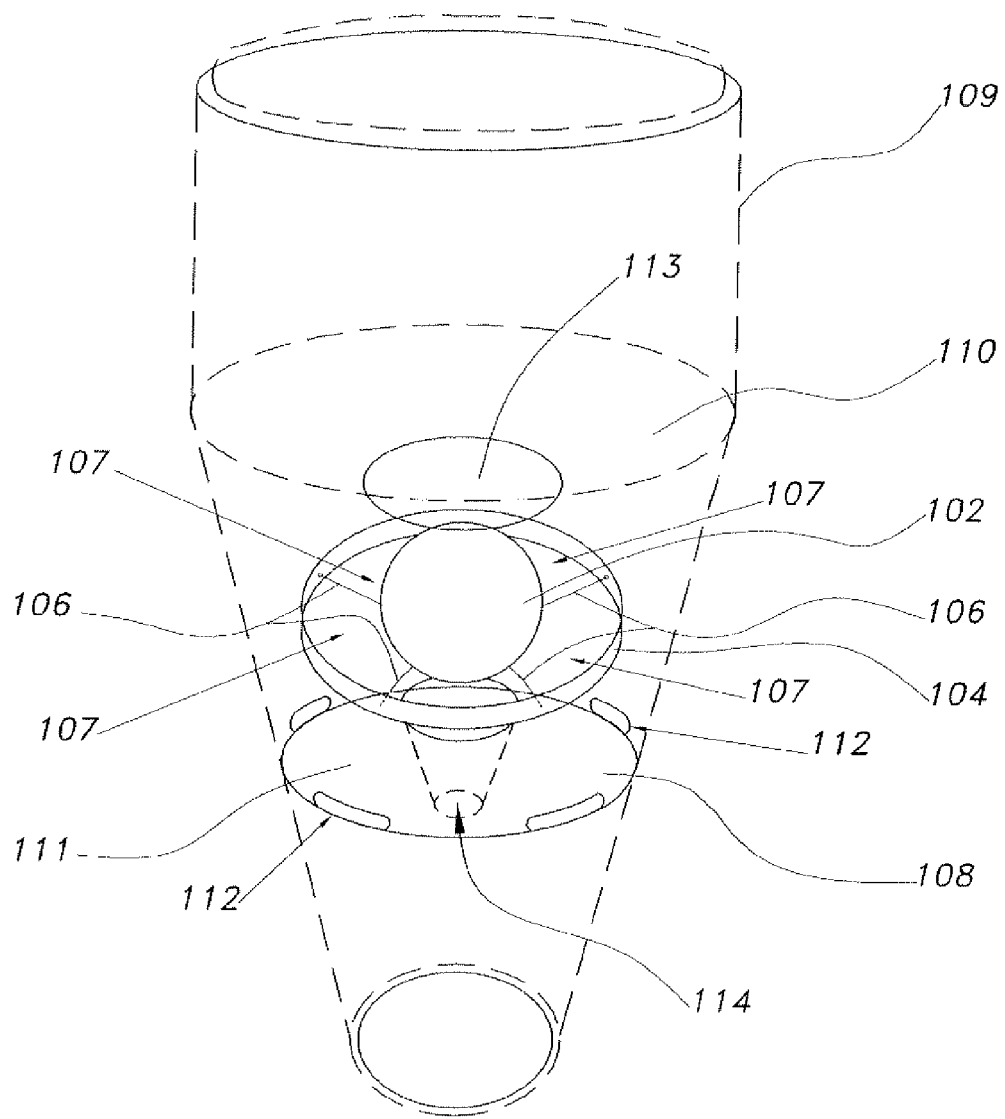
FIG. 12 is a perspective view of the particulate separator portion of the rain gauge of FIG. 1.

As noted above, coarse calibration of gauge 100 is determined by the configuration and relative dimensions of the elements of the gauge 100, particularly in the receptacles or buckets 127, 127a. Thus, the overall configuration and relative dimensions may be varied, depending upon the expected volumes of rainfall to be measured. As shown in FIG. 12, the housing 109 preferably has a substantially circular cross section. Exemplary dimensions include a diameter for the open upper end of housing 109 of approximately 190 mm, and an overall height of housing 109 of 336.4 mm. The stand 135 may raise housing 109 with respect to a support surface by approximately 58.6 mm, based upon the above exemplary dimensions. The measurement portion of the housing 109, which is between the closed lower end thereof and the lower surface of frustoconical secondary particulate separator 108, may have a height of approximately 102 mm, and the height measured between the vents 112 and the upper edge of conical funnel 109 may be approximately 120 mm.

It is to be understood that the present invention is not limited to the embodiments described above, but encompasses any and all embodiments within the scope of the following claims.

We claim:

1. A rain gauge with a particulate separator, comprising:
a housing having an open upper end and a closed lower end;
a funnel mounted in the upper end of said housing, the funnel having a central nozzle;
first and second receptacles for receiving rain, each of the receptacles being pivotally mounted within the housing beneath the central nozzle, the first and second receptacles being counterbalanced with respect to one another so that upon filling of the first receptacle with a predetermined volume of rain, the first receptacle pivoting to discharge the collected rain and the second receptacle pivoting to receive rain to be collected, the first and second receptacles providing oscillatory pivotal motion with respect to the housing;
to means for measuring rainfall based upon the oscillatory pivotal motion of the first and second receptacles;
a primary particulate separator mounted beneath the central nozzle and above the first and second receptacles, the primary particulate separator being a substantially spherical body defining at least one open space formed between the primary particulate separator and the housing;
a secondary particulate separator mounted beneath the primary particulate separator and above the first and second receptacles, the secondary particulate separator being substantially frustoconical and having a central channel formed therethrough; and
at least one vent formed through the housing, the vent being aligned with an upper outer edge of the secondary particulate separator;
whereby liquid flowing through the central nozzle clings to an outer surface of the primary particulate separator and flows through the central channel formed through the secondary particulate separator to alternately fill the first and second receptacles, and particulate matter flowing through the central nozzle is deflected by the outer surface of the primary particulate separator to strike an inclined upper surface of the frustoconical secondary particulate separator to fall through the at least one vent, exiting the housing.

2. The rain gauge with a particulate separator as recited in claim 1, wherein said housing has a lower end having an outlet formed therein for discharging the collected rain.

3. The rain gauge with a particulate separator as recited in claim 2, further comprising a stand, said housing being supported on the stand for raising said housing with respect to a support surface.

4. The rain gauge with a particulate separator as recited in claim 1, further comprising means for calibrating the counterbalance of said first and second receptacles with respect to one another.

5. The rain gauge with a particulate separator as recited in claim 1, further comprising a plurality of supports radially extending from said first particulate separator to said housing, the at least one open space comprising a plurality of open spaces defined between the plurality of supports.

6. A particulate separator for a rain gauge, comprising:
a primary particulate separator adapted for mounting beneath a central nozzle and above first and second receptacles of a balancing rain gauge, the primary particulate separator being a substantially spherical body adapted for forming at least one open space between the primary particulate separator and an inner wall of a housing of the balancing rain gauge; and
a secondary particulate separator adapted for mounting beneath the primary particulate separator and above the first and second receptacles of the balancing rain gauge, the secondary particulate separator being substantially frustoconical and having a central channel formed therethrough, at least one vent being formed through the housing, the vent being aligned with an upper outer edge of the secondary particulate separator;
whereby liquid flowing through the central nozzle clings to an outer surface of the primary particulate separator and flows through the central channel formed through the secondary particulate separator to alternately fill the first and second receptacles, and particulate matter flowing through the central nozzle is deflected by the outer surface of the primary particulate separator to strike an inclined upper surface of the frustoconical secondary particulate separator to fall through the at least one vent, exiting the housing.

7. The particulate separator for a rain gauge as recited in claim 6, further comprising a plurality of supports radially extending from said first particulate separator to the inner wall of said housing, the at least one open space comprising a plurality of open spaces defined between the plurality of supports.

* * * * *